2,811,493
ELASTOMERIC CELLULAR PRODUCTS OBTAINED FROM ALKYD RESIN-DIISOCYANATE MIXTURE

Eli Simon, Los Angeles, and Frank W. Thomas, Burbank, Calif., assignors to Lockheed Aircraft Corporation, Burbank, Calif.

No Drawing. Application May 11, 1953, Serial No. 354,380

19 Claims. (Cl. 260—2.5)

This invention relates to foamed or cellular materials and relates more particularly to cellular plastic or resin products that are flexible and elastic.

In general, the cellular plastics heretofore prepared by reacting a polyester resin, an isocyanate and a catalyst with or without modifiers and additives, are rigid, unyielding and inelastic. Such products are finding considerable application in the various industries because they may be readily produced by simply mixing together the several ingredients and then pouring the resultant reactant mixture into the mold, cavity, or the like, to foam up and form the cellular, low-density high-strength mass at atmospheric pressure and room temperature. However, the range or field of usefulness of these materials has been limited to some extent due to their characteristic rigidity and inelasticity. We have discovered that this general type of cellular plastic product may be made flexible and elastic by incorporating a combination of reactive and inert plasticizers in the reactant mixtures or compositions. It is, therefore, an object of this invention to provide expanded or cellular resin products that are yielding, resilient and elastic and, therefore, suitable for uses or applications for which the other rigid and unyielding foamed plastics of this class are not suited.

It is another object of the invention to provide cellular or expanded resin products that may be varied or differentiated in their physical characteristics so that some are extremely soft, resembling foamed latex rubber, others are soft leather-like products, and others may be more resistant to deformation. All of the products of the invention are characterized to a greater or lesser extent by the ability to flow or deform under load and to slowly return to their original shape and dimensions when relieved of the load. The materials or products of the invention act differently than putty and like materials which flow plastically under load but which do not return completely when the deforming load is removed and act differently than true elastomers, such as rubber, which return rapidly and elastically to their original shape and dimensions when the deforming load is removed. The cellular products of this invention while being capable of ready deformation under load return quite slowly, upon the removal of the deforming load, to their original shape and dimensions. This special or peculiar characteristic of the materials well adapts them for use in situations where the true elastomers are not suitable because of their rapid "spring-back" or elastic return.

Another object of the invention is to provide foaming reactant compositions and their cellular reaction products characterized by the use or inclusion of reactive and inert (so far as reaction with the isocyanate component is concerned) plasticizers employed either as a blend or as individual components. We discovered that by incorporating the reactant and inert plasticizers in the reactant polyester-isocyanate mixture that the cellular or foamed reaction products have the elastomeric-slow return characteristics above referred to. The results of thus including both "reactive" and inert plasticizers in the polyester-isocyanate mixtures are unexpected since the quasi elastomeric cellular reaction products have little or no similarity to the materials produced by merely plasticizing a polyester-isocyanate foaming mixture.

We have found that the two plasticizers, that is the reactive and the inert plasticizers, may be mixed with or in the polyester-isocyanate mixture at the time the same is to be poured or molded or the two plasticizers may be premixed with the resin component to obtain a single intermediate that may be more convenient for use.

A further object of the invention is to provide foamed or expanded deformable and elastic plastic products of the kind described that are especially well suited for castings or moldings of the foamed-in-place type and that are easily removable from the mold or die. The products are durable and have excellent surface finish.

Other objectives and advantages of the invention will become apparent from the following description which includes several examples or formulations that are intended primarily to be illustrative and typical and not restrictive in nature.

The components of the formulations or reactant mixtures for producing the expanded or cellular products include one or more polyester resins, reactive plasticizer, an inert plasticizer and an isocyanate. In addition the reactant compositions may include one or more fillers, a wetting agent and one or more pigments.

The polyester resin or resins may be selected from several types or classes. It is preferred to employ polyester resins having an acid number of from 10 to 50 and having a functionality ratio of from 3 to 1½ OH groups to 1 COOH group and a water content of from 0.2 to 5% by weight. Typical of the saturated polyester resins that are useful are the following Resins A, B and C.

RESIN A

| | Mols |
|---|---|
| Trimethylol propane | 4 |
| Adipic acid | 2½ |
| Phthalic anhydride | ½ |

RESIN B

| | |
|---|---|
| Trimethylol propane | 3 |
| Adipic acid | 2½ |
| Phthalic anhydride | ½ |

RESIN C

| | |
|---|---|
| Trimethylol propane | 5 |
| Adipic acid | 2½ |
| Phthalic anhydride | ½ |

In resins such as the Resins A, B and C, all or part of the trimethylol propane may be replaced by triethanol propane or trimethylol ethane. Excellent results have been obtained where Resin A has been incorporated in the reactant resin-isocyanate mixture or composition. An example of an unsaturated polyester resin that has been found to be practical and effective in the formulations of the invention is prepared from:

RESIN D

| | Mols |
|---|---|
| Tri-isopropenol (1) propane | 4 |
| Adipic acid | 2½ |
| Phthalic anhydride | ½ |

Various combinations of diols and triols may be used in preparing the polyester resins where the OH functionality of the same contributed by the triol constitutes a minimum of 50% of the total OH functionality. The following Resin E is an example of such a resin.

RESIN E

|  | Mols |
|---|---|
| Trimethylol propane | 3 |
| Propylene glycol | 2½ |
| Adipic acid | 2½ |
| Phthalic anhydride | ½ |

The acidic components of the resins useful in the foaming compositions may be chosen preferably from the dibasic acids including phthalic anhydride, adipic acid, sebacic acid, itaconic acid, glutaric acid, malonic acid, maleic anhydride, fumaric acid, azelaic acid and succinic acid. A preferred proportion of the polyester resin component is approximately 50 parts by weight for each 100 parts by weight of the sum of the components although good results have been obtained in using from 30 to 65 parts by weight per 100 parts by weight of the total in preparing the reactant foaming composition for producing the cellular plastic products.

The reactive plasticizer or plasticizers are polyglycols, namely polyethylene glycol and polypropylene glycol. The following represents a typical formula for polyethylene glycol:

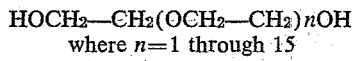

where $n=1$ through 15

We prefer to employ as the reactive plasticizer a polyglycol composed of a blend of factors or portions of varying molecular weights. For example polyethylene glycol having an average molecular weight of 400 may have in its composition factors or portions varying in molecular weight from 184 to 689 in the proportions such as represented in the following table:

| Mol. wt. | Composition percent by wt. |
|---|---|
| 184–204 | 0.5– 1.0 |
| 228–248 | 2.5– 3.5 |
| 272–292 | 5.5– 6.5 |
| 316–336 | 9.0–10.0 |
| 360–380 | 12.0–13.0 |
| 405–425 | 13.5–14.5 |
| 449–469 | 13.5–14.5 |
| 493–513 | 11.5–12.5 |
| 537–557 | 9.5–10.5 |
| 581–601 | 6.5– 7.5 |
| 625–645 | 4.5– 5.5 |
| 669–689 | 3.5– 4.5 |

The average molecular weight of such a polyglycol as used in our formulations may range from 200 to 2000 and is preferably between 200 and 1000. Blends of polyglycols of different average molecular weights may also be employed effectively in the foaming reactant compositions. Polypropylene glycols represented by the general formula: $OH(C_3H_6O)nC_3H_6OH$ where $n=1$ through 15 have also been found to be practical and effective, employed individually as the active plasticizer of the reactive compositions or blended with the polyethylene glycols. The polyethylene glycols and the polypropylene glycols are commercially available in selected average molecular weights but containing factors or portions varying in molecular composition as described above in connection with the polyethylene glycol and it is preferred to use such commercial products although of course polyglycols each having a single molecular weight or a single range of molecular weights in their composition may be used individually or in blends as desired. In fact any polyglycol of the types noted having a molecular weight not exceeding 2000 or having an average molecular weight not exceeding 2000 may be used individually as the reactive plasticizer or such polyglycols may be employed as blends to constitute the active plasticizer component of the reactant foaming mixtures. A preferred proportion of the reactive plasticizer is 65 parts by weight to 100 parts by weight of the polyester resin but the reactive plasticizer may be used in the proportion of from 20 to 130 parts by weight per 100 parts by weight of the polyester resin of producing the cellular plastic products.

We have found it to be desirable to incorporate in the reactant foaming compositions or mixtures one or more inactive or inert plasticizers in order to obtain the desired characteristics of flexibility and elasticity in the cellular resin products. These plasticizers are termed inactive or inert because they are not reactive with the isocyanate component of the foaming mixtures. Such inactive plasticizers include cyclohexyl levulinate, methyl abietate, dihydromethyl abietate and dioctyl succinate. Other ester plasticizers such as di(2 ethyl hexyl) adipate, dibutyl phthalate, tri(2-ethyl hexyl phosphate), triethylene glycol di(2-ethyl butyrate), triethylene glycol di(2-ethyl hexoate) di(n-hexyl phthalate), and derivatives of the above named ester plasticizers may be used individually or in blends or combinations. The inactive plasticizer component is preferably in the proportion of about 12 parts by weight to 100 parts by weight of polyester resin and may be used in the proportion of from about 2 to about 20 parts by weight for each 100 parts by weight of polyester resin to obtain the desired physical characteristics of the cellular products.

The isocyanate component of the foaming reactant compositions is preferably meta-toluene diisocyanate although hexamethylene diisocyanate, p,p′-diisocyanatodiphenylmethane may be used individually or in blends in place of or blended with the meta-toluene diisocyanate if cellular products of somewhat inferior quality and physical characteristics are acceptable. A preferred proportion of the isocyanate component is about 50 parts by weight to 100 parts by weight of the polyester resin component but the proportion of the isocyanate component may be varied between about 30 and about 100 parts by weight per 100 parts by weight of the polyester resin.

The isocyanate component is preferably the reaction product of one of the above named isocyanates preferably the meta-toluene diisocyanate, with one or more high molecular weight thermoplastic film forming resin additives. The incorporation of such additives in the isocyanate component serves to assist in stabilizing the foam during the reaction, increases the elasticity of the cell walls during the foaming and performs other functions productive of cellular or expanded plastics of good physical properties. The resin additives are soluble in the isocyanate and may or may not react therewith. The following resin additives have each been found to be effective in the resin-isocyanate reactant system. The film forming resin additives which we prefer to incorporate in the isocyanate component include ethyl cellulose, chlorinated natural rubber, benzyl cellulose, natural rubber, vinyl chloride-vinyl acetate copolymers, polyvinyl chloride, polyvinyl acetate, polystyrene, poly dichloro styrene, acrylate and methacrylate resins and their copolymers, and polyvinyl butyral. In general a concentration of the high molecular weight thermoplastic resin additives of about 2 parts by weight for each 100 parts by weight of the isocyanate gives excellent results. The concentrations of the individual additives depend to a considerable extent upon the nature of the particular additives and the concentration of the additives may range from a fraction of a part to 15 parts by weight for each 100 parts of the isocyanate. Ethyl cellulose has been found to be particularly desirable as the resin additive in the isocyanate component. Satisfactory results have been obtained by using commercial grades of ethyl cellulose wherein the substitution values are between 2.15 and 2.60 ethoxyl groups for each glucose unit, that is where the ethoxyl content is from 43% to 50%. The preferred ethoxyl content range of the ethyl cellulose is from 45 to 49.5%. The concentration of the ethyl cellulose in the isocyanate component is from 0.03 to 15 parts by weight of the ethyl cellulose for each 100 parts by weight of the isocyanate, a preferred concentration being about 6% by weight of the ethyl cellulose. The viscosity of the ethyl cellulose resins which we employ is between 7 and 200 centipoises and preferably 100 centipoises, the viscosity being determined on the basis of a 5% by weight solution in a 60:40 toluene-ethanol solvent at 25° C.

Additives that we have found advantageous in obtaining uniformity of cell size of the cellular products, to aid in controlling the reaction of the mixtures and to obtain desirable release of the cellular products from their molds are metallic soaps. Divalent and trivalent metallic soap powders useful in the reactant compositions or mixtures are metallic soap powders of fatty acids having from 12 to 20 carbon atoms such as:

> Zinc stearate
> Aluminum stearate
> Calcium stearate
> Magnesium stearate
> Magnesium hydroxy stearate
> Barium stearate
> Zinc laurate
> Calcium oleate
> Strontium stearate These additives may be employed individually or in blends or combinations. We have found the aluminum and zinc stearates to be particularly effective for the purposes above mentioned. The metallic soap powder additive or filler component is preferably used in the reactant mixtures in the proportion of about 4.5 parts by weight to 100 parts by weight polyester resin but the proportion of the soap powders may range from a fraction of 1 part to 15 parts to 100 parts by weight of polyester resin. The soap powders may be omitted from the reactant foaming compositions if desired.

We prefer to incorporate one or more wetting agents in the foaming reactant compositions to promote uniform rise of the foam, to assist in obtaining the desired cell structure and uniformity of cell size in the expanded plastic products. It has been found most desirable to use as the wetting agents the mixed alkyl-sodium, potassium, magnesium or ammonium soaps of the phosphoric acids represented by the following type formulae:

*Type Formula 1*

$(HPO_3)_n$ where $n=2, 3, 4$ or $6$

*Type Formula 2*

$M_xR_y(P_3O_{10})_n$, where $n=1, 2$ or $3$

*Type Formula 3*

$M_xR_yPO_4$

In these formulae M=Na, K, Mg or $MH_4$, and R=methyl through dodecyl alkyl groups saturated or unsaturated, substituted or unsubstituted by halide, amino, keto or other groups.

The acids of type Formula 1 include:

> $(HPO_3)_6$=hexameta phosphoric acid
> $(HPO_3)_4$=tetrameta phosphoric acid
> $(HPO_3)_3$=trimeta phosphoric acid
> $(HPO_3)_2$=dimeta phosphoric acid The acids of type Formula 2 include:

$(H_5P_3O_{10})_n$, where $n=1, 2$ or $3$=tripoly phosphoric acid

The acids of type Formula 3 include:

> $H_3PO_4$=ortho phosphoric acid

The wetting agents may be used individually or as suitable mixtures. The wetting agent component is used in the reactant mixture in the proportion of from a fraction of 1 part by weight to 10 parts by weight and preferably in the amount of about 2½ parts by weight per 100 parts by weight of polyester resin. The wetting agent is not essential and may be omitted if desired.

It may be desired to include appropriate pigmentation in the foaming mixtures to obtain either or both improved strength characteristics and color requirements of the products. Standard or typical commercial carbon blacks of the type used in inks are suitable but where the color black is desired we prefer to use a colloidal carbon black combining an ultra channel black and a suitable wetting agent. Other pigments that are useful in the foaming plastic material mixtures include silica, titanium dioxide, lead oxides, other insoluble metal oxides and metallic leafing powders. The pigment or pigments are used in the foaming mixtures in the proportion of from a fraction of 1 part by weight to 10 parts by weight and usually in the amount of about 2 parts by weight for each 100 parts by weight of polyester resin.

In preparing the reactant mixtures we have found that the reactive and inactive plasticizers may conveniently be mixed with the resin and the wetting agent, fillers and pigments, when the latter are used, to constitute a single component or "package" which may later be mixed with the isocyanate component to produce the foaming reactant composition. However, if desired, the plasticizers, the resin, the wetting agent, fillers, etc., may be individually mixed with the isocyanate component when the product is to be produced. The isocyanate component when incorporating the ethyl cellulose or other high molecular weight additives is prepared or pre-mixed by dissolving the additive in the isocyanate either at room temperature or up to approximately 225° F. The foaming mixture when prepared as above described is merely poured into the mold or cavity or otherwise applied to react and foam up at atmospheric pressure and at room temperature. The resultant cellular plastic product is preferably heat cured at from 150 to 250° F. for from 1 to 2 hours. The elasticity and flexibility of the products may be varied at will by varying the relative proportions and types of the plasticizers, and the isocyanate. For example the product obtained from the following formulation of Example I is more yielding and elastic than the product produced from Example II. The following are typical illustrative examples of the formulations for preparing the expanded or cellular plastic producing foaming mixtures and of course are subject to considerable variation to obtain cellular products differing considerably in their physical characteristics. The ingredients or components in the following examples are in approximate parts by weight.

EXAMPLE I

| | Parts |
|---|---|
| Resin A—H₂O content 1½%—acid number 10–50 | 45 |
| Polypropylene glycol—average molecular weight 400 | 30 |
| Aluminum stearate | 2 |
| Carbon black | ½ |
| Cyclohexyl levulinate | 5 |
| Meta-toluene diisocyanate, containing 6 parts ethyl cellulose per 100 parts of the meta-toluene diisocyanate | 22 |
| Wetting agent | 1 |

In this and the following examples, unless otherwise specified, the ethyl cellulose may have a viscosity of from 50 to 200 centipoises, and preferably 100 centipoises, and an ethoxyl content of from 45 to 49.5% and the wetting agent may be sodium 2, ethylhexyl derivatives of tripoly phosphoric acid.

EXAMPLE II

| | Parts |
|---|---|
| Resin A having an acid number of 10–50, and an H₂O content of 1½% | 45 |
| Aluminum stearate | 2 |
| Polypropylene glycol—average molecular weight 400 | 30 |
| Carbon black | ½ |
| Methyl abietate | 5 |
| Meta-toluene diisocyanate, containing 6 parts ethyl cellulose per 100 parts of the meta-toluene diisocyanate | 22 |
| Wetting agent | 1 |

EXAMPLE III

| | Parts |
|---|---|
| Resin A having an H₂O content of 1½%—acid number 10–50 | 45 |
| Polyethylene glycol, average molecular weight 800 | 30 |
| Aluminum stearate | 2 |
| Carbon black | ½ |
| Cyclohexyl levulinate | 5 |
| Wetting agent | 1 |
| Meta-toluene diisocyanate containing 6 parts ethyl celluose for each 100 parts meta-toluene diisocyanate | 22 |

EXAMPLE IV

| | Parts |
|---|---|
| Resin A—1.5% H₂O—acid number 10–50 | 45 |
| Polypropylene glycol—average molecular weight 400 | 30 |
| Aluminum stearate | 2 |
| Carbon black | ½ |
| Cyclohexyl levulinate | 5 |
| Meta-toluene diisocyanate containing 6 parts ethyl cellulose for each 100 parts meta-toluene diisocyanate | 25 |
| Wetting agent | 1 |

EXAMPLE V

| | Parts |
|---|---|
| Resin A having an acid number of 10–50, and an H₂O content of 1½% | 45 |
| Polypropylene glycol—average molecular weight 400 | 30 |
| Aluminum stearate | 2 |
| Carbon black | ½ |
| Methyl abietate | 5 |
| Meta-toluene diisocyanate, containing 2 parts ethyl cellulose having an ethoxyl content of from 43 to 50% for each 100 parts meta-toluene diisocyanate | 20 |
| Wetting agent | 1 |

The foregoing Examples I to V inclusive illustrate the effect of varying the primary components that is the polyester resin, the reactive and inactive plasticizers and the isocyanate components, the other components, that is the fillers, pigment and wetting agent may or may not be maintained the same in such formulations. Example I is productive of a soft yieldable foam or cellular material whereas the product of Example II is somewhat harder than that produced by the formulation of Example I by reason of the change in the plasticizer component. Again, Example III illustrates the effect of employing different plasticizer components and is productive of a cellular material harder than that obtained from the formulation of Example I. Example IV illustrates the effect of altering the isocyanate component and is productive of a cellular plastic material harder than that obtainable from Example I. Example V also illustrates the effect of modifying the isocyanate component and results in a cellular product somewhat softer than the product obtained from Example II. It is to be understood that in these examples zinc stearate, magnesium stearate and the other divalent and trivalent metallic soap powders enumerated above may be substituted for the aluminum stearate and instead of employing the carbon black aluminum leafing powder or mixtures of metallic leafing powders and carbon black or dyes may be employed. The following Examples VI and IX are further illustrative of typical formulations of the invention:

EXAMPLE VI

| | Parts |
|---|---|
| Resin A—H₂O content 1%—acid number 10–50 | 45 |
| Polypropylene glycol—average molecular weight 700 | 15 |
| Polyethylene glycol—average molecular weight 425 | 15 |
| Magnesium stearate | 1 |
| No. 422 aluminum leafing powder | 1 |
| Dioctyl succinate | 7½ |
| Meta-toluene diisocyanate containing 6 parts ethyl cellulose having a viscosity of 100 centipoises per 100 parts meta-toluene diisocyanate | 15 |
| Meta-toluene diisocyanate containing 2 parts ethyl cellulose having a viscosity of 200 centipoises for each 100 parts meta-toluene diisocyanate | 10 |
| Wetting agent | 1 |

EXAMPLE VII

| | Parts |
|---|---|
| Resin C—H₂O content 2%—acid number 25 | 45 |
| Polypropylene glycol—average molecular weight 425 | 25 |
| Polypropylene glycol—average molecular weight 600 | 10 |
| Zinc stearate | 2 |
| Cyclohexyl levulinate | 5 |
| Meta-toluene diisocyanate | 5 |
| Meta-toluene diisocyanate containing 6 parts ethyl cellulose having a viscosity of from 25 to 200 centipoises for each 100 parts meta-toluene diisocyanate | 20 |

EXAMPLE VIII

| | Parts |
|---|---|
| Resin A—H₂O content 1.5%—acid number 20 | 45 |
| Polypropylene glycol—average molecular weight 400 | 30 |
| Methyl abietate | 5 |
| Meta-toluene diisocyanate containing 2 parts ethyl cellulose having a viscosity of 200 centipoises and an ethoxyl content of 45% for each 100 parts meta-toluene diisocyanate | 22 |

EXAMPLE IX

| | Parts |
|---|---|
| Resin E—H₂O content 3%—acid number 10–50 | 45 |
| Polyethylene glycol—average molecular weight 725 | 20 |
| Di(2 ethyl hexyl) adipate | 10 |
| Aluminum stearate | 4 |
| Meta-toluene diisocyanate containing 2 parts ethyl cellulose having a viscosity of 150 centipoises and an ethoxyl content of from 43 to 50% for each 100 parts meta-toluene diisocyanate | 25 |
| Wetting agent | 4 |

The formulations or compositions of the invention are particularly well suited for producing castings or moldings of the foamed-in-place type. The cast or molded products have been found to be extremely durable and have good surface finishes. The moldings or castings are readily removed from the cavities or dies and have been found to have uniform cell structure and physical strength characteristics throughout the individual products or castings.

It should be understood that the invention is not intended to be based upon or dependent upon the theories we have expressed. Nor is the invention to be regarded as limited to the express procedure or materials set forth, these details being given only by way of illustration and to aid in clarifying the invention. We do not regard such specific details as essential to the invention except insofar as they are expressed by way of limitation in the following claims in which it is our intention to claim all novelty inherent in the invention as broadly as is permissible in view of the prior art.

We claim:

1. The yielding resilient cellular material which is the product of reaction of a foaming composition comprising on an approximate part by weight basis 100 parts of an alkyd resin having an acid number of from 10 to 50 and having a functionality ratio of from 3 to 1½ OH groups to 1 COOH group, from 20 to 130 parts of a polyglycol reactive plasticizer having an average molecular weight of from 200 to 2000 selected from the group consisting of polyethylene glycol and polypropylene glycol, from 2 to 20 parts of an inactive ester plasticizer selected from the group consisting of cyclohexyl levulinate, methyl abietate, dihydromethyl abietate, dioctyl succinate, di (2-ethyl hexyl) adipate, dibutyl phthalate, tri (2-ethyl hexyl)

phosphate, triethylene glycol di (2-ethyl butyrate), triethylene glycol di (2-ethyl hexoate) and di (n-hexyl phthalate), and from 30 to 100 parts meta-toluene diisocyanate containing from a fraction of one part to 15 parts of a high molecular weight thermoplastic resin additive soluble in the meta toluene diisocyanate and selected from the group consisting of ethyl cellulose, chlorinated rubber, benzyl cellulose, natural rubber, vinyl chloride-vinyl acetate copolymers, polyvinyl chloride, polyvinyl acetate, polystyrene and polydichlorostyrene.

2. The yielding resilient cellular material which is the product of reaction of a foaming composition comprising on an approximate part by weight basis, 100 parts of an alkyd resin having an acid number of from 10 to 50 and having a functionality ratio of from 3 to 1½ OH groups to 1 COOH group, from 20 to 130 parts of a polyglycol active plasticizer having an average molecular weight of from 200 to 2000 selected from the group consisting of polyethylene glycol and polypropylene glycol, from 2 to 20 parts of an inactive ester plasticizer selected from the group consisting of cyclohexyl levulinate, methyl abietate, dihydromethyl abietate, dioctyl succinate, di (2-ethyl hexyl) adipate, dibutyl phthalate, tri (2-ethyl hexyl) phosphate, tri-ethylene glycol di (2-ethyl butyrate), tri-ethylene glycol di (2-ethyl hexoate) and di (n-hexyl phthalate), from a fraction of one part to 15 parts of a metallic soap powder of a fatty acid having from 12 to 20 carbon atoms, and from 30 to 100 parts of meta-toluene diisocyanate containing from a fraction of one part to 15 parts per 100 parts of the diisocyanate of ethyl cellulose having a viscosity of from 7 to 200 centipoises and an ethoxyl content of from 43 to 50%.

3. The yielding resilient cellular material which is the product of reaction of a foaming composition comprising on an approximate part by weight basis 100 parts of an alkyd resin having an acid number of from 10 to 50 and having a functionality ratio of from 3 to 1½ OH groups to 1 COOH group, from 20 to 130 parts of a polyglycol active plasticizer having an average molecular weight of from 200 to 2000 selected from the group consisting of polyethylene glycol and polypropylene glycol, from 2 to 20 parts of an inactive ester plasticizer selected from the group consisting of cyclohexyl levulinate, methyl abietate, dihydromethyl abietate, dioctyl succinate, di-(2-ethyl hexyl) adipate, dibutyl phthalate, tri(2-ethyl hexyl) phosphate, tri-ethylene glycol di(2-ethyl butyrate), tri-ethylene glycol di(2-ethyl hexoate) and di(n-hexyl phthalate), from a fraction of one part to 15 parts of a metallic soap powder of a fatty acid having from 12 to 20 carbon atoms, from a fraction of one part to 10 parts of a wetting agent selected from the group consisting of the mixed alkyl-sodium, potassium, magnesium and ammonium soaps of phosphoric acids which phosphoric acids have the type formulae:

(HPO3)n, where n=6, 4, 3 or 2,
(H5P3O10)n, where n=1, 2 and 3,
H3PO4, where the alkyl groups are from methyl through dodecyl, from a fraction of one part to 10 parts pigment, and from 30 to 100 parts of meta-toluene diisocyanate containing from a fraction of one part to 15 parts of a high molecular weight thermoplastic resin additive soluble in the meta toluene diisocyanate and selected from the group consisting of ethyl cellulose, chlorinated rubber, benzyl cellulose, natural rubber, vinyl chloride-vinyl acetate copolymers, polyvinyl chloride, polyvinyl acetate, polystyrene and polydichlorostyrene.

4. The yielding resilient cellular material which is the product of reaction of a foaming composition comprising on an approximate part by weight basis 100 parts of an alkyd resin having an acid number of from 10 to 50 and having a functionality ratio of from 3 to 1½ OH groups to 1 COOH group, from 20 to 130 parts of a polyglycol reactive plasticizer having an average molecular weight of from 200 to 2000 selected from the group consisting of polyethylene glycol and polypropylene glycol, from 2 to 20 parts of an inactive ester plasticizer selected from the group consisting of cyclohexyl levulinate, methyl abietate, dihydromethyl abietate, dioctyl succinate di-(2-ethyl hexyl) adipate, dibutyl phthalate, tri(2-ethyl hexyl) phosphate, tri-ethylene glycol di(2-ethyl butyrate), tri-ethylene glycol di(2-ethyl hexoate) and di(n-hexyl phthalate), 30 to 100 parts of meta-toluene diisocyanate containing from 0.03 to 15 parts ethyl cellulose per 100 parts of the meta-toluene diisocyanate, and ethyl cellulose having a viscosity of from 7 to 200 centipoises and an ethoxyl content of from 43 to 50%.

5. The yielding resilient cellular material which is the product of reaction of a foaming composition comprising on an approximate part by weight basis, 100 parts of an alykd resin having an acid number of from 10 to 50 and having a functionality ratio of from 3 to 1½ OH groups to 1 COOH group, from 20 to 130 parts of a polyglycol active plasticizer having an average molecular weight of from 200 to 2000 selected from the group consisting of polyethylene glycol and polypropylene glycol, from 2 to 20 parts of an inactive ester plasticizer selected from the group consisting of cyclohexyl levulinate, methyl abietate, dihydromethyl abietate, dioctyl succinate, di-(2-ethyl hexyl) adipate, dibutyl phthalate, tri(2-ethyl hexyl) phosphate, tri-ethylene glycol di(2-ethyl butyrate), tri-ethylene glycol di(2-ethyl hexoate) and di(n-hexyl phthalate), from a fraction of one part to 15 parts of a metallic soap powder of a fatty acid having from 12 to 20 carbon atoms, from 30 to 100 parts of meta-toluene diisocyanate containing from 0.03 to 15 parts ethyl cellulose for each 100 parts of the meta-toluene diisocyanate, the ethyl cellulose having a viscosity of from 7 to 200 centipoises and an ethoxyl content of from 43 to 50%.

6. The yielding resilient cellular material which is the product of reaction of a foaming composition comprising on an approximate part by weight basis 100 parts of an alkyd resin having an acid number of from 10 to 50 and having a functionality ratio of from 3 to 1½ OH groups to 1 COOH group, from 20 to 130 parts of a polyglycol active plasticizer having an average molecular weight of from 200 to 2000 selected from the group consisting of polyethylene glycol and polypropylene glycol, from 2 to 20 parts of an inactive ester plasticizer selected from the group consisting of cyclohexyl levulinate, methyl abietate, dihydromethyl abietate, dioctyl succinate, di-(2-ethyl hexyl) adipate, dibutyl phthalate, tri(2-ethyl hexyl) phophate, tri-ethylene glycol di(2-ethyl butyrate), tri-ethylene glycol di(2-ethyl hexoate) and di(n-hexyl phthalate), from a fraction of one part to 15 parts of a metallic soap powder of a fatty acid having from 12 to 20 carbon atoms, from a fraction of one part to 10 parts of a wetting agent selected from the group consisting of the mixed alkyl ester soaps of phosphoric acids which phosphoric acids have the type formulae:

(HPO3)n, where n=6, 4, 3 and 2,
(H5P3O10)n, where n=1, 2 and 3,
H3PO4, where the alkyl groups are from methyl through dodecyl and the positive portion of the soap is selected from the group consisting of sodium, potassium and ammonium, from a fraction of one part to 10 parts pigment, from 30 to 100 parts of meta-toluene diisocyanate containing from 0.03 to 15 parts ethyl cellulose for each 100 parts of the meta-toluene diisocyanate, the ethyl cellulose having a viscosity of from 7 to 200 centipoises and an ethoxyl content of from 43 to 50%.

7. The yielding resilient cellular material which is the product of reaction of a foaming composition comprising on an approximate part by weight basis 100 parts of an alkyd resin having an acid number of from 10 to 50 and having a functionality ratio of from 3 to 1½ OH groups to 1 COOH group, from 20 to 130 parts polyethylene glycol having a molecular weight of from 200 to 2000, from 2 to 20 parts of an inactive ester plasticizer selected from the group consisting of cyclohexyl levulinate, methyl abietate, dihydromethyl abietate, dioctyl succinate, di-(2-ethyl hexyl) adipate, dibutyl pathalate, tri(2-ethyl hexyl) phosphate, tri-ethylene glycol di-(ethyl butyrate), tri-ethylene glycol di(2-ethyl hexoate) and di(n-hexyl phthalate, and from 30 to 100 parts of meta-toluene diisocyanate containing from 0.03 to 15 parts ethyl cellulose for each 100 parts of the meta-toluene diisocyanate, the ethyl cellulose having a viscosity of from 7 to 200 centipoises and an ethoxyl content of from 43 to 50%.

8. The yielding resilient cellular material which is the product of reaction of a foaming composition comprising on an approximate part by weight basis 100 parts of an alkyd resin having an acid number of from 10 to 50 and having a functionality ratio of from 3 to 1½ OH groups to 1 COOH group, from 20 to 130 parts polypropylene glycol having a molecular weight of from 200 to 2000, from 2 to 20 parts of an inactive ester plasticizer selected from the group consisting of cyclohexyl levulinate, methyl abietate, dihydromethyl abietate, dioctyl succinate, di-(2-ethyl hexyl) adipate, dibutyl phthalate, tri(2-ethyl hexyl) phosphate, tri-ethylene glycol di(2-ethyl butyrate), triethylene glycol di(2-ethyl hexoate) and di(n-hexyl phthalate), and from 30 to 100 parts of meta-toluene diisocyanate containing from 0.03 to 15 parts ethyl cellulose for each 100 parts of the meta-toluene diisocyanate, the ethyl cellulose having a viscosity of from 7 to 200 centipoises and an ethoxyl content of from 43 to 50%.

9. The yielding resilient cellular material which is the product of reaction of a foaming composition comprising on an approximate part by weight basis 100 parts of an alkyd resin having an acid number of from 10 to 50 and having a functionality ratio of from 3 to 1½ OH groups to 1 COOH group, from 20 to 130 parts of a plasticizer having an average molecular weight of from 200 to 2000 selected from the group consisting of polyethylene glycol and polypropylene glycol, from 2 to 20 parts of an ester plasticizer selected from the group consisting of cyclohexyl levulinate, methyl abietate, dihydromethyl abietate, dioctyl succinate, di-(2-ethyl hexyl) adipate, dibutyl phthalate, tri(2-ethyl hexyl) phosphate, tri-ethylene glycol di(2-ethyl butyrate), tri-ethylene glycol di(2-ethyl hexoate) and di(n-hexyl phthalate, and from 30 to 100 parts of meta-toluene diisocyanate containing from 0.03 to 15 parts ethyl cellulose for each 100 parts of the meta-toluene diisocyanate, the ethyl cellulose having a viscosity of from 7 to 200 centipoises and an ethoxyl content of from 43 to 50%.

10. The yielding resilient cellular material which is the product of reaction of a foaming composition comprising on an approximate part by weight basis 100 parts of an alkyd resin having an acid number of from 10 to 50 and having a functionality ratio of from 3 to 1½ OH groups to 1 COOH group, from 20 to 130 parts of a polyglycol reactive plasticizer having an average molecular weight of from 200 to 2000 selected from the group consisting of polyethylene glycol and polypropylene glycol, from 2 to 20 parts of an inactive ester plasticizer selected from the group consisting of cyclohexyl levulinate, methyl abietate, dihydromethyl abietate, dioctyl succinate, di-(2-ethyl hexyl) adipate, dibutyl phthalate, tri(2-ethyl hexyl) phosphate, tri-ethylene glycol di(2-ethyl butyrate), tri-ethylene glycol di(2-ethyl hexoate) and di(n-hexyl phthalate), and from 30 to 100 parts of an isocyanate component comprising meta-toluene diisocyanate and from a fraction of one part to 15 parts of a high molecular weight thermoplastic resin soluble in the meta-toluene diisocyanate selected from the group consisting of ethyl cellulose, chlorinated rubber, benzyl cellulose, natural rubber, vinyl chloride-vinyl acetate copolymers, polyvinyl chloride, polyvinyl acetate, polystyrene, and poly dichloro styrene.

11. The resilient cellular reaction product of a foaming composition comprising on an approximate part by weight basis 45 parts of an alkyd resin having an acid number of from 10 to 50 and a water content of about 1.5%, 30 parts polypropylene glycol having an average molecular weight of about 400, 2 parts aluminum stearate powder, 5 parts cyclohexyl levulinate, 1 part sodium 2, ethylhexyl derivative of tripolyphosphoric acid, and 22 parts of meta-toluene diisocyanate containing 6 parts per 100 parts of the diisocyanate of ethyl cellulose having a viscosity of from 50 to 200 centipoises and an ethoxyl content of from 45 to 49.5%.

12. The resilient cellular reaction product of a foaming composition comprising on an approximate part by weight basis 45 parts of an alkyd resin having an acid number of from 10 to 50 and a water content of about 1.5%, 30 parts polypropylene glycol having an average molecular weight of about 400, 2 parts aluminum stearate powder, 5 parts methyl abietate, 1 part sodium 2, ethylhexyl derivative of tripolyphosphoric acid, and 22 parts of meta-toluene diisocyanate containing 6 parts per 100 parts of the diisocyanate of ethyl cellulose having a viscosity of from 50 to 200 and an ethoxyl content of from 45 to 49.5%.

13. The resilient cellular reaction product of a foaming composition comprising on an approximate part by weight basis 45 parts of a polyester resin having an acid number of from 10 to 50 and a water content of about 1.5%, 30 parts polyethylene glycol having an average molecular weight of 800, 2 parts aluminum stearate, 5 parts cyclohexyl levulinate, 1 part sodium 2, ethylhexyl derivative of tripolyphosphoric acid, and 22 parts of meta-toluene diisocyanate containing 6 parts ethyl cellulose per each 100 parts of the diisocyanate, the ethyl cellulose having a viscosity of from 50 to 200 centipoises and an ethoxyl content of from 45 to 45.9%.

14. The resilient cellular reaction product of a foaming composition comprising on an approximate part by weight basis 45 parts of a polyester resin having an acid number of from 10 to 50 and a water content of about 1.5%, 30 parts polypropylene glycol having an average molecular weight of about 400, 2 parts aluminum stearate powder, 5 parts cyclohexyl levulinate, 1 part sodium 2, ethylhexyl derivative of tripoly phosphoric acid, and 25 parts of meta-toluene diisocyanate containing 6 parts per 100 parts of the diisocyanate of ethyl cellulose having a viscosity of from 50 to 200 centipoises and an ethoxyl content of from 45 to 49.5%.

15. The resilient cellular reaction product of a foaming composition comprising on an approximate part by weight basis 45 parts of a polyester resin having an acid number of from 10 to 50 and a water content of about 1.5%, 30 parts polypropylene glycol having an average molecular weight of about 400, 2 parts aluminum stearate powder, 5 parts cyclohexyl levulinate, 1 part sodium 2, ethylhexyl derivative of tripoly phosphoric acid, from a fraction of one part to 10 parts carbon black, and 22 parts of meta-toluene diisocyanate containing 6 parts per 100 parts of the diisocyanate of ethyl cellulose having a viscosity of from 50 to 200 centipoises and an ethoxyl content of from 45 to 49.5%.

16. The resilient cellular reaction product of a foaming composition comprising on an approximate part by weight basis 45 parts of a polyester resin having an acid number of from 10 to 50 and a water content of about 1.5%, 30 parts polypropylene glycol having an average molecular weight of about 400, 2 parts aluminum stearate powder, 5 parts methyl abietate, 1 part sodium 2, ethylhexyl derivative of tripoly phosphoric acid, from a fraction of one part to 10 parts pigment, and 22 parts of meta-toluene diisocyanate containing 6 parts per 100 parts of the diisocyanate of ethyl cellulose having a viscosity of from 50 to 200 centipoises and an ethoxyl content of from 45 to 45.9%.

17. The yielding cellular reaction product, on an approximate part by weight basis, of 45 parts of an alkyd resin having an acid number of from 10 to 50 and a water content of about 1.5%, 30 parts polypropylene glycol having an average molecular weight of about 400, 2 parts aluminum stearate, 5 parts methyl abietate, and 22 parts meta-toluene-diisocyanate containing about 6 parts ethyl cellulose per each 100 parts of the meta-toluene diisocyanate, the ethyl cellulose having a viscosity of from 50 to 200 and an ethoxyl content of from 45 to 49.5%.

18. The yielding cellular reaction product, on an approximate part by weight basis, of 45 parts of an alkyd resin having an acid number of from 10 to 50 and a water content of about 1.5%, 30 parts polypropylene glycol having an average molecular weight of about 400, 2 parts of a metallic soap powder of a fatty acid having from 12 to 20 carbon atoms, 5 parts methyl abietate, and 22 parts of meta-toluene diisocyanate containing 6 parts per each 100 parts of the diisocyanate of ethyl cellulose having a viscosity of from 50 to 200 and an ethoxyl content of from 45 to 49.5%.

19. The yielding cellular reaction product, on an approximate part by weight basis, of 45 parts of an alkyd resin having an acid number of from 10 to 50 and a water content of about 1.5%, 30 parts polypropylene glycol having an average molecular weight of about 400, 5 parts methyl abietate, and 22 parts meta-toluene diisocyanate containing about 6 parts ethyl cellulose per each 100 parts of the meta-toluene diisocyanate, the ethyl cellulose having a viscosity of from 50 to 200 and an ethoxyl content of from 45 to 49.5%.

References Cited in the file of this patent

UNITED STATES PATENTS

| | | |
|---|---|---|
| 2,284,896 | Hanford et al. | June 2, 1942 |
| 2,577,281 | Simon et al. | Dec. 4, 1951 |
| 2,591,884 | Simon et al. | Apr. 8, 1952 |
| 2,602,783 | Simon et al. | July 8, 1952 |
| 2,729,618 | Muller et al. | Jan. 3, 1956 |

OTHER REFERENCES

Plastics (London), vol. 11, pages 257–262, May 1947.

Bayer: Rubber Chem. and Tech., Oct.–Dec. 1950 (vol. 23, No. 4, pages 823 and 826).

Del Bell et al.: German Plastics Practice, 1946, pages 231, 303, 311, 313, 463–465.